United States Patent Office 3,814,709
Patented June 4, 1974

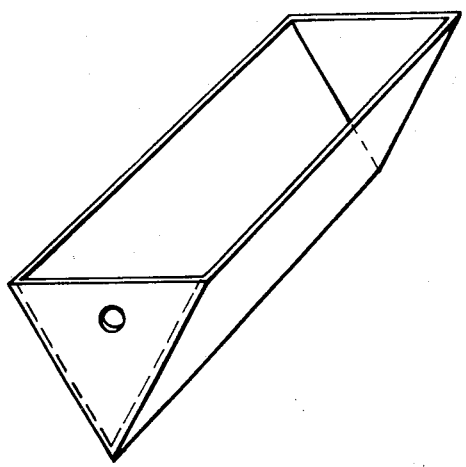

3,814,709
LACQUER BINDERS ESPECIALLY SUITABLE FOR ELECTRODEPOSITION BASED ON MALEINIZED POLYBUTADIENE OILS
Hans-Jurgen Meissner, Krefeld-Bockum, Rolf Dhein, Krefeld, and Rolf Kuchenmeister, Krefeld-Bockum, Germany, assignors to Bayer Aktiengesellschaft, Leverkusen, Germany
Continuation of application Ser. No. 239,690, Mar. 30, 1972, which is a continuation-in-part of application Ser. No. 119,863, Mar. 1, 1971, both now abandoned. This application July 10, 1973, Ser. No. 378,040
Claims priority, application Germany, Apr. 4, 1970, P 20 16 223.6; Apr. 7, 1971, P 21 16 975.5
Int. Cl. C09d 3/00
U.S. Cl. 260—23.7 A      3 Claims

ABSTRACT OF THE DISCLOSURE

Polymeric products based on polybutadiene oil having a viscosity of 3–100 poise at 20° C., an unsaturated fatty acid ester, maleic anhydride and, optionally, an ethylenically unsaturated monomer, said product being characterized by an acid viscosity over 30,000 poise at 20° C. and the use thereof after hydrolysis and salt formation as a lacquer binder in the form of an aqueous dispersion.

CROSS-REFERENCE TO RELATED APPLICATIONS

This application is a continuation of application Ser. No. 239,690 filed Mar. 30, 1972 and now abandoned which, in turn, is a continuation-in-part of application Ser. No. 119,863 filed Mar. 1, 1971 and now abandoned.

The subject of the present invention are binders for aqueous lacquers which can be applied in the usual manner, but especially by the electrodeposition lacquering process. A further subject of the invention is a process for the manufacture of such binders.

Aqueous solutions of natural polyesters with acid numbers above 35, neutralized with basic compounds, have already been used for the manufacture of electrodeposition lacquers (Ind. Eng. Chem. 1934, 26, 882). Such polyesters are the shellac products of natural origin, having acid numbers of about 35 to 70. A disadvantage of the natural polyesters is that their composition greatly varies depending on the place of origin (H. Kittel, Farben- u. Lack-Kunststoff-Lexikon (Encyclopaedia of Plastics for Paints and Lacquers), 1952, page 661, paragraph 1). Such natural products are therefore rather unsuitable for the manufacture of high quality industrial lacquers.

Attempts have therefore been made to replace the natural polycarboxylic acid resins by synthetic polycarboxylic acid resins (British Patent Specification 972,169, U.S. Patent Specification 3,230,162 and DAS (German Published Specification) 1,546,943)). These synthetic polycarboxylic acid resins are maleinized oils, styrene-modified maleinized oils, maleinized fatty acids, maleinized resins, alkyd resins, maleinized modified butadiene-dissobutylene copolymers, vinyl resins and acrylic resins. However, it is subsequently proved necessary to improve the corrosion resistance and hardness of these polycarboxylic acid resins by adding phenolic resins, urea resins and melamine resins (DAS (German Published Specification) 1,546,943, column 3, line 58). In the meantime it has become known that such admixtures are not fully co-deposited and that therefore coatings of non-uniform composition result (Farbe u. Lack (Paint and Lacquer), 70, 823 (1964)). The resins also frequently show inadequate resistance to hydroldysis (British Patent Specification 1,102,652, page 1, lines 23–29).

In order to overcome these defects, attempts have been made to synthesize new polycarboxylic acid resins. These include adducts of maleic anhydride to polybutadiene oils, which are reacted with water to give polycarboxylic acids and can, in the form of their amine salts be diluted with water (DAS (German Published Specification) 1,219,684, and British Patent Specification 1,102,652). Such raw materials offer certain advantages, since they are unsponifiable. However, they suffer from the defect that the lacquer films harden-through inadequately. Furthermore the products are of excessive viscosity and very dark in color (DOS (German Published Specification) 1,920,496, page 1, line 5 from the bottom and page 2, line 4 from the bottom). It was possible to overcome these disadvantages when unsaturated fatty acids, instead of maleic anhydride, were added to polybutadiene oils (DOS (German Published Specification) 1,920,496). This however produces technical problems which are difficult to solve, since only a part of the fatty acids originating from natural oils adds on and the remainder has to be distilled from the resin melt in vacuo or by means of steam at high temperatures. Attempts have also already been made to add unsaturated fatty oils and maleic anhydride to polybutadienes. Since only gelled, unusable products were produced with the requisite quantities of maleic anhydride, it was subsequently necessary to resort to fumaric acid, which is significantly less easily accessible.

The subject of the present invention are polymeric products from 10 to 70% by weight of an unsaturated fatty acid ester, 5 to 20% by weight of maleic anhydride and 85 to 10% by weight of a polybutadiene oil of viscosity 3–100 poise at 20° C. After hydrolysis of the maleic anhydride rings and subsequent salt formation, for example, with amines, these products represent lacquer raw materials which can be dispersed in water.

For further improvement of the technical lacquer properties, these products can also contain yet further copolymerized ethylenically unsaturated comonomers. The amount of these additional, modifying, comonomers is between 5 and 40% by weight relative to the total quantity of unsaturated fatty acid ester, maleic anhydride and polybutadiene oil.

Particularly preferred lacquer raw materials consist of 20 to 60% by weight of the unsaturated fatty acid ester, 5 to 15% by weight of maleic anhydride and 25 to 75% by weight of polybutadiene oil in a polymerized form. The preferred amount of modifying monomer is between 5 and 15% by weight, relative to the total quantity of the remaining monomers.

The binders of the invention yield coatings which in contrast to the previously known raw materials show superior corrosion protection, very good hardness and very good long-term elasticity. Suitable materials for coatings by the electrodeposition lacquering process are especially aqueous dispersions which in contrast to the known clear aqueous solutions and the previously used synthetic resin dispersions which were also cloudy (DAS (German Published Specification) 1,546,943, column 1, line 27) show excellent storage stability and still yield smooth, dense and firmly adhering deposits even at extremely high potentials of 300 and 400 volt. Clear, aqueous lacquers based on the polymers according to the invention are less suitable for the electrodeposition lacquering process. They contain a high proportion of organic solvents or basic compounds, as a result of which the optimum deposition conditions are clearly lost. Such solutions are particularly suitable for the manufacture of aqueous lacquers which are applied by brushing, spraying, flow-coating, dipping or casting.

Suitable polybutadiene oils for the manufacture of the binders according to the invention are those with viscosities of 3 to 100 poise, preferably 3–30 poise, at 20° C. The polybutadiene oils should preferably have iodine numbers of 300 to 500. By polybutadiene oil, in the sense of the present invention, there are to be understood the known, optionally also modified, polybutadienes with non-terminal cis- and trans-double bonds, and also vinyl double bonds.

Unsaturated fatty acid esters are preferably esters of higher unsaturated fatty acids and aliphatic alcohols. Dihydric or polyhydric aliphatic alcohols are especially preferred. Examples of suitable alcohols are methanol, ethylene glycol, propanediol, butanediol, glycerol, perhydrobisphenol, trimethylolpropane and pentaerythritol. In general, unsaturated oils in their natural composition are used as unsaturated fatty acid esters; as examples, soya oils, linseed oil, castor oil, groundnut oil, tall oil and other vegetable oils may be mentioned. It is however also possible to employ the unsaturated fatty acids on which these oils are based, in the form of their esters with the alcohols mentioned.

Suitable ethylenically unsaturated monomers for the modification of the lacquer raw materials are for example styrene, alkylstyrenes such as α-methylstyrene and vinyltoluene, acrylonitrile, acrylic acid alkyl esters, preferably those with 1–6 carbon aotms, methacrylic acid alkyl esters, preferably those with 1–6 carbon atoms, acrylamide and methacrylamide.

The process for the manufacture of the lacquer raw materials according to the invention is characterised in that unsaturated fatty acid esters, polybutadiene oil of low viscosity and maleic anhydride are reacted at temperatures of 180 to 270° C. with exclusion of air. In this process, polymerisation inhibitors such as hydroquinone, tert.-amylhydroquinone, diphenylamine, copper or copper salts, for example copper naphthenate, can be employed. The presence of such inhibitors is admittedly not absolutely essential for the process. All constituents of the lacquer raw material can be reacted with one another in one step. It is however also possible first to add the unsaturated fatty acid ester to the polybutadiene oil. This reaction preferably takes place at 180–270° C. Thereafter maleic anhydride is added in this case, preferably at 180–240° C.

Conversely, it is also possible first to add maleic anhydride to the polybutadiene oil and then to carry out the reaction with the unsaturated fatty acid ester.

The further modification with ethylenically unsaturated monomers which may have to be carried out is as a rule performed as a further reaction step following the actual manufacture of the binder. For this purpose, the binders can be reacted with the further monomer at temperatures of between about 100 and 220° C. This reaction can again be carried out in the presence of inhibitors.

To achieve optimum results when used as dip-varnish binders for the electrical industry, the maleic anhydride content of the polymers should be so chosen that after first splitting open the anhydride groups with water, where appropriate, acid numbers of between about 50 and 120 result. Products of lower acid numbers are frequently no longer adequately capable of dispersion in water, whilst resins with acid numbers of above 120 do not always give perfect coatings.

The neutralisation of the binders is preferably carried out with amines. Suitable amines are, for example, aqueous dimethylamine and trimethylamine solutions, as well as ethylamine, diethylamine and triethylamine, propylamine and butylamine, ethanolamine, diethanolamine and triethanolamine, and also N-methylethanolamine and N,N-dimethylethanolamine. It is however also possible to use ammonia and alkalis.

Within the range of acid numbers indicated, the degree of neutralisation should be between 70 and 100% to obtain particularly dense coatings and to achieve good throwing power.

The choice of the oil component and its appropriate proportion in the polymer depends on the desired end use. For especially hard and extremely corrosion-resistant coatings, a proportion of oil of 20–30% in the polymer is advisable. Particularly elastic and at the same time also very hard and just as corrosion-resistant coatings are obtained with proportions of oil of 40–60%. Higher oil contents reduce the good corrosion protection properties of the binders.

The possible further modification with aromatic vinyl compounds permits the hardness and scratch resistance to be raised again without reducing the long-term elasticity.

The aqueous lacquer dispersions can be manufactured with conjoint use of water-soluble and/or water-insoluble solvents, such as for example methanol, ethanol, propanol, isopropanol, ethylene glycol monomethyl ether, monoethyl ether, monoisopropyl ether and monobutyl ether, diethylene glycol, monoethers and diethers of diethylene glycol, dimethylformamide, dimethylsulphoxide, dioxane, methyl ethyl ketone, cyclohexanone, benzine and xylene. When using alcoholic solvents, half-esters can in part be formed. If it is desired to dissolve the polymers without reducing the acid number, it is advisable to convert the anhydrides into carboxyl groups with water, where appropriate in the presence of basic catalysts.

The amount of solvent in the aqueous lacquers can vary. Aqueous lacquers for the electrodeposition lacquering process should however only contain small proportions of solvents. They then yield particularly dense and firmly adhering coatings, whilst the frequently clear aqueous lacquers containing larger amounts of organic solvents yield nonuniform thick coatings even at low voltages.

Pigmented aqueous lacquer dispersions can contain all customary pigments, fillers and lacquer auxiliaries. The aqueous lacquers for the conventional lacquering processes can additionally contain water-soluble phenolic resins, urea resins or melamine resins.

The aqueous electrodeposition lacquers should have a solids content of 5–25%, preferably 10–20%.

The coatings produced from the aqueous lacquer preparations dry even at room temperature. In 30–60 minutes at about 150–200° C., particularly firmly adhering, water-resistant lacquer films having unusually high corrosion resistance are obtained.

FIG. 1 of the drawings shows a perspective view of a gutter pertinent to several of the following examples.

EXAMPLE 1

3040 g. of polybutadiene oil of viscosity 8.3 poise/20° C. and having an iodine number of 370, and 1168 g. of soya oil are together heated to 260° C. in a nitrogen atmosphere until a sample of the reaction product, as a 70% strength solution in xylene, has a flow time of 50 seconds in the flow cup according to 4 DIN 53,211. 3367 g. of the reaction product and 374 g. of maleic anhydride are then heated together to 180° C. in a nitrogen atmosphere and stirred at this temperature until a sample, as a 50% strength solution in xylene, has a flow time of 55 seconds in the flow cup according to 4 DIN 53,211. The polymer then has an acid number of 73 after splitting open the anhydride rings.

2500 g. of the polymer are treated, at 95° C., with a mixture of 300 g. of ethylene glycol monobutyl ether, 12.5 g. of triethylamine and 62.5 g. of distilled water, and the mixture is stirred 30 minutes at this temperature. After adding a further 450 g. of ethylene glycol monobutyl ether and 137.5 g. of triethylamine, the mixture is adjusted with distilled water to give a 70% strength polymer solution. A 10% strength aqueous, cloudy dispersion of this polymer solution has a pH-value of 8.35, measured with the glass electrode at 20° C.

A lacquer paste is prepared from 478 g. of the 70% strength resin solution obtained, 12 g. of neutral carbon black (Raven 40®, Messrs. Columbia Carbon Corp.) and 54.8 g. of aluminium silicate pigment (ASP 100®, Messrs. Mineral and Chemical Corp. of America). 405.6 g. of this paste are diluted with 2594.4 g. of distilled water. This lacquer preparation is introduced into a 10 cm. wide, 16.5 cm. long and 22 cm. high container of stainless steel, equipped with a glass stirrer. A 10.5 cm. wide, 13.5 cm. long and 0.5 cm. thick phosphatized steel sheet (UST 1405 m. treated according to the rust protection-Bonder 125-process, Messrs. Metallgesellschaft Frankfurt), wired as the anode, is coated for 2 minutes at a bath temperature of 30° C. and a constant potential of 270 volt, whilst stirring, thereby producing a water-insoluble coating which is then stoved for 30 minutes at 170° C. The finished lacquer film has a layer thickness of 25μ.

EXAMPLE 2

2850 g. of polybutadiene oil with a viscosity of 8.3 poise/20° C. and an iodine number of 370, and 1297 g. of soya oil are together heated to 260° C. in a nitrogen atmosphere until a sample of the reaction product, as a 70% strength xylene solution, has a flow time of 50 seconds in the flow cup according to 4 DIN 53,211. 3497 g. of the reaction product, 4.43 g. of copper naphthenate (containing 10% of copper) and 438 g. of maleic anhydride are then heated together to 180° C. in a nitrogen atmosphere and stirred at this temperature until a sample, as a 70% strength xylene solution, has a flow time of 111 seconds in the flow cup according to DIN 53,211. The acid number is then 92 after splitting open the anhydride rings. 385 g. of styrene are added dropwise over the course of 90 minutes, at 140° C., to 3461 g. of the reaction product, whilst stirring. Thereafter the mixture is further stirred at 140° C. until a 50% strength xylene solution of the polymer has a flow time of 55 seconds in the flow cup according to 4 DIN 53,211. The polymer then has an acid number of 75 after splitting open the anhydride rings, and a solids content of 96.5%.

2588 g. of the polymer are treated at 95° C. wtih a mixture of 300 g. of ethylene glycol monobutyl ether, 12.5 g. of triethylamine and 62.5 g. of distilled water, and stirred for 30 minutes at this temperature. After adding a further 450 g. of ethylene glycol monobutyl ether and 219 g. of triethylamine, the mixture is adjusted with distilled water to give a 70% strength polymer solution. A 10% strength aqueous, cloudy dispersion of this polymer solution has a pH-value of 8.25, measured with a glass electrode at 20° C.

A pigmented aqueous lacquer is prepared from the 70% strength resin solution in accordance with Example 1. At 90 volts, the lacquer yields a coating on phophatized sheet steel (for quality, see Example 1), which after 30 minutes' stoving at 170° C. has a layer thickness of 25μ.

COMPARISON EXPERIMENT A 3800 g. of polybutadiene oil having a viscosity of 8.3 poise/20° C. and an iodine number of 370, 7 g. of copper naphthenate (containing 10% of copper) and 422 g. of maleic anhydride are together heated at 240° C. and kept at this temperature until a sample of the resin, as a 50% strength xylene solution, has a flow time of 55 seconds in the flow cup according to 4 DIN 53,211. The acid number is then 70 after splitting open the anhydride rings. 2500 g. of resin are treated at 95° C., correspondingly to Example 1, with a mixture of 3300 g. of ethylene glycol monobutyl ether, 12.5 g. of triethylamine and 62.5 g. of distilled water and the whole is stirred for 30 minutes at this temperature. After adding 450 g. of ethylene glycol monobutyl ether and 104 g. of triethylamine, the mixture is then adjusted with distilled water to give a 70% resin solution. A 10% strength dilution of the resin solution with distilled water then has a pH-value of 8.1, measured with a glass electrode at 20° C. A pigmented aqueous lacquer is prepared from the 70% strength resin solution in accordance with Example 1. The comparison lacquer, at 100 volts, yields a coating on phosphatized sheet steel (for quality, see Example 1) which after 30 minutes' stoving at 170° C. has a layer thickness of 25μ.

COMPARISON EXPERIMENT B

A lacquer is prepared from 413.4 g. of a 55% strength neutralized glycol ether/water solution of a castor alkyd resin which can be diluted with water (and yields clear aqueous lacquer solutions, in contrast to the polymers according to the invention), having an oil content of 40%, a phthalic anhydride content of 29% and an acid number of 45, 23.7 g. of hexamethoxymethylmelamine resin (95% strength) (Maprenal WL®, Cassella-Farbwerke), 9 g. of carbon black (for quality, see Example 1), 41.1 g. of aluminium silicate pigment (for quality, see Example 1), and 2512.8 g. of distilled water. This lacquer has a pH-value of 7, measured with a glass electrode at 20° C. A phosphatized steel sheet (for quality, see Example 1) is coated for 2 minutes at a temperature of 30° C. and a constant potential of 50 volts. The coating is stoved for 30 minutes at 170° C. and then has a layer thickness of 25μ.

The advantages of the binders according to the invention are described in the tables which follow. Table I, containing Examples 1 and 2 and the Comparison Experiment A, shows that the films of the new binders, whilst having the same or better long-term elasticity, are distinctly harder than the films of the known maleinized-modified polybutadiene oils.

TABLE I

| | Film thickness, μ | Scratch hardness according to Clemen, g. | Pendulum hardness according to Konig after 72 hours' ageing at 70° C. (seconds) | Erichsen deep-drawing value after 72 hours ageing at 70° C. (mm.) |
|---|---|---|---|---|
| Example: | | | | |
| 1 | 25 | 120 | 134 | 4.7 |
| 2 | 25 | 140 | 134 | 3.3 |
| Comparison Experiment A | 25 | 80 | 81 | 3.1 |

Table II summarizes Examples 1 and 2 and the Comparison Experiment B. The result of the salt spray test shows the high corrosion resistance of the films obtained from the binders according to the invention.

TABLE II

| | Film thickness, μ | Salt spray test according to DIN 50,021 |
|---|---|---|
| Example: | | |
| 1 | 25 | After 240 hours: no change. |
| 2 | 25 | Do. |
| Comparison Experiment B | 25 | After 96 hours: full of blisters |

The superior storage stability of the cloudy aqueous lacquers obtained from the new binders, in comparison to the known aqueous synthetic resin solutions, is illustrated by Table III. To determine the storage stability, 10% strength aqueous lacquers are prepared from the neutralized 70% strength polymer solution of Example 2, and from a mixture of 158.1 g. of 55% strength neutralized glycol ether/water solution of the castor alkyd resin (Comparison Experiment B) and 13.7 g. of hexamethoxymethylmelamine resin (95% strength) (for quality, see Comparison Experiment B), by adding distilled water, and were stored in closed glass bottles at 60° C.

TABLE III

Storage of 10% strength aqueous lacquers at 60° C.

| | Appearance of the aqueous lacquers at the beginning of storage | Extinction[1] of the aqueous lacquers, layer thickness 0.5 cm. | Appearance of the aqueous lacquers after 7 days |
|---|---|---|---|
| Example 2 | Cloudy dispersion | 1.50 | Unchanged. |
| Comparison Experiment B. | Clear solution | 0.01 | Resin has precipitated. |

[1] Leifo-E electrophotometer, filament lamp and 530 nm. filter; extinction of $H_2O = 0$.

In further developing the abovementioned lacquer binders it has been found that these are particularly advantageously suitable for the internal coating of hollow articles using high deposition voltages, if they possess a viscosity of above 30,000 poise at 20° C. and, in the form of the aqueous lacquers, display degrees of neutralization of 40–70%.

Because of the low base content of these aqueous lacquers according to the invention longer operation of the electrodeposition baths is possible without arriving, so rapidly, at a stoichiometric excess of base, which undesirably increases the pH value and the conductivity. Additional measures for removing the excess bases, for example electrodialysis and the addition of low molecular acids or acid resins, can therefore be omitted or at least greatly restricted when using the aqueous lacquers. This makes the operation of the dipping bath easier and more economical.

Suitable polybutadiene oils for the manufacture of these highly viscous binders are preferably those with viscosities of 3–30 poise at 20° C., with iodine numbers of 300–500 and with double bonds which display cis-structures to the extent of more than 50%.

The remaining components for the manufacture of these lacquer binders according to the invention are the same which are already mentioned. Soja oil has proved particularly suitable as a fatty acid ester, and styrene is preferentially used for modifying the reaction product from maleic anhydride and the reaction product of fatty acid ester and polybutadiene oil. The reaction of the components takes place in the sequence indicated below, and the reaction conditions are essentially the same as those according to the instructions given above, but provision is made, through lengthening the reaction times or increasing the condensation temperature, that the binder shall have a particularly high viscosity, which should be above 30,000 poise at 20° C.

The subject of the present invention are therefore especially lacquer binders based on reaction products of 10–85, preferably 25–75, percent by weight of a polybutadiene oil having a viscosity of 3–100, preferably 3–30 poise, at 20° C., 10–70, preferably 20–60, percent by weight of an unsaturated fatty acid ester, 5–20, preferably 5–15, percent by weight of maleic anhydride and, optionally, 5–40 percent by weight, preferably 5–15 percent by weight, of further ethylenically unsaturated monomers, especially styrene, which have been obtained by first reacting the polybutadiene oil with the unsaturated fatty acid ester and reacting the resulting reaction product subsequently with maleic anhydride and, where relevant, with the further monomer, especially styrene, and neutralizing the products thus obtained, if appropriate after hydrolysis of the maleic anhydride radicals, by means of amines, characterized in that the lacquer binders have a viscosity of over 30,000 poise at 20° C.

As can be seen from the examples given below, it has been found that the products for the manufacture of which the indicated sequence of reaction steps is observed differ substantially from products which, though manufactured with corresponding components, are manufactured using a different sequence of the condensation stages.

For neutralizing the binders, the same amines are again employed as indicated above. It has however been found that the highly viscous binders are distinguished by particularly advantageous properties if they are only neutralized to a degree of neutralization of 40–70% with amines.

EXAMPLE 3

3230 g. of polybutadiene oil having a viscosity of approx. 8 poise at 20° C. and an iodine number of approx. 450, and 1064 g. of soya oil are heated together in a nitrogen atmosphere to 260° C. until a sample having a viscosity of 42 seconds (70% strength in xylene, DIN 53,211) has been produced. 3921 g. of the reaction product are then mixed with 11.2 g. of a 50% strength solution of copper naphthenate (copper content 10%) in white spirit (boiling point 140/190°). The mix is stirred for half an hour at 130° C. and after adding 610 g. of maleic anhydride is heated in a nitrogen atmosphere to 170° C. until a 70% strength solution of the product in xylene has a viscosity of 270 seconds (DIN 53,211). The acid number is then 120. 3650 g. of the mix are subsequently treated with 195 g. of styrene over the course of 45 minutes at 140° C. in a nitrogen atmosphere, whilst stirring. The mixture is stirred at 140° C. until a 50% strength solution of the product in xylene has a viscosity of 33 seconds (DIN 53,211). The mix is thereafter heated to 180° C. and kept at this temperature until it has a viscosity of 110° seconds (50% strength in xylene, DIN 53,211). The product then has an acid number of 104, a solids content of 99% and a viscosity, at 20° C., of approx. 60,000 poise. (The viscosity was measured at a shear of 5,000 dyn./cm.$^2$).

3292 g. of the polymeric product are treated with a mixture of 395 g. of ethylene glycol monobutyl ether and 82 g. of distilled water at 95° C. in the presence of catalytic amounts of triethylamine and the whole is stirred for 30 minutes at this temperature. After cooling, the mix is stirred with a further 395 g. of ethylene glycol monobutyl ether. The resin solution then has a solids content of approx. 80%. The acid number is then approx. 99, relative to the binder.

65% of the acid groups are neutralized with triethylamine. An aqueous lacquer having a solids content of 10% and containing 2% of carbon black, relative to binder, is then produced from the partly neutralized resin solution, carbon black (L-Carbon Black T®, Messrs. Degussa) and distilled water. 11.5 litres of aqueous lacquer are introduced into a 24 cm. wide, 30 cm. long and 22 cm. high glass container equipped with a glass stirrer. A gutter (FIG. 1) shaped like a small boat is dipped into the aqueous bath so as to leave a 5 mm. broad edge free. The gutter is wired as the anode. It is electrophoretically coated for 3 minutes at a bath temperature of 30° C., whilst stirring, the dipping bath being operated at a voltage of 280 volts in the first minute, at a voltage of 330 volts in the second minute and at a voltage of 380 volts in the third minute. A water-insoluble coating is produced on the inside and outside of the gutter and is stoved for 30 minutes at 170° C. A particularly good internal coating of the gutter is achieved under deposition conditions of 1 minute at 380 volts, 1 minute at 440 volts and 1 minute at 500 volts.

COMPARISON EXPERIMENT A[3]

3230 g. of polybutadiene oil having a viscosity of approx. 8 poise at 20° C. and an iodine number of approx. 450 are reacted with 1076 g. of linseed oil and 588 g. of maleic anhydride in the presence of 8.8 g. of copper naphthenate (10% copper content) in accordance with the instructions for the manufacture of an adduct of liquid polybutadiene and linseed oil (according to German Offenlegungsschrift (German Published Specification) 1,815,014, page 9). The adduct has an acid number of 86 and a viscosity of approx. 241 poise at 20° C.

An 80% strength resin solution is prepared from the adduct in accordance with Example 3, and an aqueous lacquer (10% solids content, degree of neutralization 65%) pigmented with carbon black is prepared therefrom. The coating of a gutter (in accordance with the instruction of Example 3) is not possible with this lacquer at a deposition programme of 1 minute at 280 volts, 1 minute at 330 volts and 1 minute at 380 volts, because of electrolysis occurring.

COMPARISON EXPERIMENT B[3]

Adduct I 4185 g. of polybutadiene oil having a viscosity of approx. 8 poise at 20° C. and an iodine number of approx. 450 are reacted with 315 g. of maleic anhydride in the presence of 8.1 g. of copper naphthenate (10% copper content) in accordance with the instructions for the manufacture of an adduct of liquid polybutadiene and maleic anhydride (according to German Offenlegungsschrift (German Published Specification) 1,815,014, page 8). The adduct has an acid number of 61.

Adduct II 3875 g. of linseed oil are reacted with 675 g. of maleic anhydride in the presence of 8.1 g. of copper naphthenate (10% copper content) in accordance with the instructions for the manufacture of an adduct of natural oil and maleic anhydride (according to German Offenlegungsschrift (German Published Specification) 1,815,014, page 8). The acid number of the adduct is 99.

The adducts I and II are mixed in the ratio of 1:1 analogously to Example 14 of German Offenlegungsschrift (German Published Specification) 1,815,014. The mixture has a viscosity of approx. 34 poise at 20° C.

An 80% strength resin solution is prepared from the adduct mixture in accordance with Example 3, and an aqueous lacquer (10% solids content, degree of neutralization 65%) pigmented with carbon black is prepared therefrom.

The coating of a gutter (according to the instruction of Example 3) is not possible with this lacquer at a deposition programme of 1 minute at 280 volts, 1 minute at 330 volts and 1 minute at 380 volts, because of electrolysis occurring.

COMPARISON EXPERIMENT C[3]

A polymer is manufactured in accordance with Example 2. The product has an acid number of approx. 90 and a solids content of approx. 97%. The viscosity is approx. 15,000 poise at 20° C.

An 80% strength resin solution is prepared from the polymer in accordance with Example 3, and an aqueous lacquer (10% solids content, degree of neutralization 65%) pigmented with carbon black is prepared therefrom.

When coating a gutter (according to the instruction of Example 3) under deposition conditions of 1 minute at 280 volts, 1 minute at 330 volts and 1 minute at 380 volts, the aqueous lacquer yields a coating on the outside and inside of the gutter, which is stoved for 30 minutes at 170° C. With a deposition programme of 1 minute at 380 volts, 1 minute at 440 volts and 1 minute at 500 volts, electrolysis already partially occurs during coating.

The table which follows summarizes the test results of the throwing power determinations:

| | Viscosity[1] of the binder in poise at 20° C. | Throwing power[2] deposition, conditions— | |
|---|---|---|---|
| | | (a) 1 min. 280 v., 1 min. 330 v., 1 min. 380 v. | (b) 1 min. 380 v., 1 min. 440 v., 1 min. 500 v. |
| Example 3 | 60,000 | 43% | 64%. |
| Comparison Experiment: | | | |
| A[3] | 241 | Electrolysis | |
| B[3] | 34 | ___do___ | |
| C[3] | 15,000 | 40% | 38%, electrolysis phenomena. |

[1] The viscosity was measured at a shear of 5,000 dyn./cm.[2].
[2] Determination of the throwing power.

The layer thickness of the coating in the interior of the gutter (FIG. 1) is measured in each case at 2 opposite points at a distance of 5, 10, 15 and 20 cm. from the 5 mm. orifice and located in the middle of the coated side walls. The throwing power is then calculated from the ratio of the average value of the internal coating thicknesses to the external coating thickness and is quoted in percent.

The gutter consists of 1 mm. thick steel sheet of quality RRST 1405. The end face of the rectangular gutter has an orifice of 5 mm$\phi$ whilst the opposite side is closed.

We claim:

1. A polymeric product consisting essentially of from 10–85% by weight of a polybutadiene oil having a viscosity of 3–100 poise at 20° C., 10–70% by weight of an unsaturated fatty acid ester and 5–20% by weight of maleic anhydride, said product having been prepared by reacting the polybutadiene oil with the unsaturated fatty acid ester at a temperature of 180 to 270° C. with exclusion of air and then reacting the resulting product with the maleic anhydride at a temperature of 180 to 240° C. with exclusion of air and being characterized by a viscosity of over 30,000 poise at 20° C.

2. The polymeric product of claim 1 which has been further reacted with 5–40% by weight, based on the weight of said polymeric product, of an ethylenically unsaturated monomer.

3. An aqueous dispersion of the polymeric product of claim 1 wherein said polymeric product has been hydrolyzed and neutralized to a neutralization degree of 70–100% and said aqueous dispersion has a solids content of 5–20%.

References Cited

UNITED STATES PATENTS

| 3,442,675 | 5/1969 | Gorke et al. | 260—23.7 |
| 3,489,704 | 1/1970 | Dunham et al. | 260—23.7 |
| 3,518,213 | 6/1970 | Miyoshi et al. | 260—23.7 |
| 3,366,563 | 1/1968 | Hart et al. | 204—181 |
| 3,196,121 | 7/1965 | McKay | 260—23.7 |
| 2,863,784 | 12/1958 | Hillyer | 106—252 |
| 3,251,790 | 5/1966 | Christenson et al. | 260—23.7 |
| 3,428,589 | 2/1969 | Coats | 260—23.7 |
| 3,546,184 | 12/1970 | Heidel et al. | 260—78.4 |
| 3,365,411 | 1/1968 | Mertzweiller et al. | 260—29.7 |
| 2,652,342 | 9/1953 | Gleason | 260—78.4 |

DONALD E. CZAJA, Primary Examiner

E. C. RZUCIDLO, Assistant Examiner

U.S. Cl. X.R.

106—252; 204—181; 260—23.7 R, 887